United States Patent [19]

Cordner

[11] Patent Number: 4,708,030

[45] Date of Patent: Nov. 24, 1987

[54] MULTI-RANGE STARTER-GENERATOR DRIVE

[75] Inventor: Michael A. Cordner, Manchester, Mo.

[73] Assignee: Sundstrand Corporation, Rockford, Ill.

[21] Appl. No.: 713,879

[22] Filed: Mar. 18, 1985

[51] Int. Cl.⁴ .............................................. F16H 37/06
[52] U.S. Cl. ........................................ 74/686; 74/674; 74/783; 74/793; 192/58 C; 318/11
[58] Field of Search ...................... 74/781 R, 782, 783, 74/793, 794, 674, 740, 750 R, 686; 192/586, 85 AA, 103 F; 123/179 A, 179 AS, 179 B; 290/1 C; 318/11, 12, 13

[56] References Cited

U.S. PATENT DOCUMENTS

| | | | |
|---|---|---|---|
| 948,436 | 2/1910 | Thomas | 74/686 X |
| 2,055,081 | 9/1936 | Jacobs | 192/85 AA |
| 2,990,503 | 6/1961 | Clark | 318/11 |
| 3,202,018 | 8/1965 | Hilpert | 192/85 AA X |
| 3,365,985 | 1/1968 | Johnson | 74/781 R X |
| 3,420,344 | 1/1969 | Hilpert et al. | 192/85 AA X |
| 3,468,193 | 9/1969 | O'Mahony | 74/686 |
| 3,503,281 | 3/1970 | Gsching et al. | 74/732 |
| 3,786,696 | 1/1974 | Aleem | 74/687 |
| 3,886,816 | 6/1975 | De Feo et al. | 74/674 X |
| 4,289,044 | 9/1981 | Dorpmond et al. | 74/789 X |
| 4,310,768 | 1/1982 | Colley | 290/1 C |
| 4,315,442 | 2/1982 | Cordner | 74/687 |
| 4,488,626 | 12/1984 | Handke | 192/58 C X |
| 4,562,897 | 1/1986 | Renneker | 192/58 B |

FOREIGN PATENT DOCUMENTS

| | | | |
|---|---|---|---|
| 621260 | 5/1961 | Canada | 318/11 |
| 1914897 | 11/1969 | Fed. Rep. of Germany | 74/750 R |
| 484018 | 8/1917 | France | 74/686 |

Primary Examiner—Rodney H. Bonck
Assistant Examiner—Dwight G. Diehl
Attorney, Agent, or Firm—Wood, Dalton, Phillips, Mason & Rowe

[57] ABSTRACT

A starter-generator drive usable in an aircraft must be of the smallest possible size and the lowest possible weight and have maximum reliability. A drive having a multi-speed transmission and a controllable hydro-viscous dissipative clutch can be interposed between an engine and a starter-generator to achieve maximum efficiency in the drive and meets the foregoing objectives.

The starter-generator drive has a multi-speed transmission for stepping the input speed from an engine to a hydro-viscous dissipative clutch to provide plural speed ranges of operation and thus limit the amount of slip that occurs within the clutch in each range to provide the constant speed drive of the generator. The dissipative clutch operates in a hydro-viscous manner whereby sudden changes of speed, as the multi-speed transmission shifts, do not vary the torque transmitted to the generator and therefore the speed of the generator. This avoids transients in the output power frequency of the generator during ratio changing of the multi-speed transmission. The starter-generator drive also provides for dissipative engine start utilizing the generator as an electric motor.

8 Claims, 6 Drawing Figures

MULTI-RANGE STARTER-GENERATOR DRIVE

FIELD OF THE INVENTION

This invention relates to a multi-range starter-generator drive to provide constant speed power to an aircraft-type constant frequency electrical generator from a variable speed power source, such as an aircraft engine. The generator is operable as an electric motor to provide an engine starting function.

BACKGROUND OF THE INVENTION

A starter-generator drive for use in aircraft is now well known in the art. An aircraft engine drives a constant frequency electrical generator. The aircraft engine can operate at variable speeds; therefore, it is necessary to have a constant speed drive driven by the engine which will provide constant speed power to the electrical generator, even though the engine may be operating at varying speeds. It is also known to use the same mechanism for starting the engine wherein the electrical generator is caused to operate as an electric motor for starting of the engine. The Aleem U.S. Pat. No. 3,786,696 is typical of such a starter-generator drive for use between an aircraft engine and a generator to transmit power in either direction. The Aleem patent has a differential and a hydrostatic transmission interconnected between the aircraft engine and the generator and the hydrostatic transmission is adjustable to provide a constant speed drive of the generator with varying speeds of the aircraft engine.

A more recent embodiment of a starter-generator drive is disclosed in the applicant's U.S. Pat. No. 4,315,442 which utilizes a differential and a hydrostatic transmission. The hydrostatic transmission is controlled to provide an energy-dissipating starting mode when the generator is operating as an electric motor to start the aircraft engine.

It is also known to utilize an electro-mechanical system for achieving a constant speed drive. The O'Mahony U.S. Pat. No. 3,468,193 discloses a constant speed drive utilizing a plurality of differentials and an electro-magnetic eddy current brake having an inductor which can be regulated to control the slip of the brake. The system includes a change speed device in the drive between an input shaft and an alternator to limit the amount of slip that occurs in the eddy current brake to avoid high power losses.

It is not known in the prior art to have a starter-generator drive utilizing a hydro-viscous dissipative clutch to provide both starter and generator drive functions and with an associated multi-speed transmission for changing the drive ratio between the engine and the dissipative clutch. The drive is smaller in size and weight and has improved reliability and cost advantages over the existing art and does not affect transmission of torque to the generator and, therefore, its speed when the multi-speed transmission changes ratios.

SUMMARY OF THE INVENTION

It is the principal object of the invention to provide a new and improved starter-generator drive utilizing a controllable hydro-viscous dissipative clutch in association with a multi-speed transmission to control the slip or speed ratio across the dissipative clutch to minimize the energy being dissipated and without effect on the torque transmitted to the generator and, hence, the speed of the generator when the multi-speed transmission changes ratios.

In carrying out the foregoing, the multi-speed transmission embodies planetary gear means and associated selectively operable brake and clutch structure and has an input connected to the engine. Selective operation of the brake and clutches will provide different drive ratios between the engine and the dissipative clutch to limit slip of the clutch and minimize the energy being dissipated. The equivalent coefficient of friction of a hydro-viscous dissipative clutch which transmits torque through the viscous shearing of an oil film is essentially independent of relative slip speed. As a result, sudden changes of speed to the input of the dissipative clutch, such as occurs when the multi-speed transmission changes ratios, does not affect the torque transmitted to the generator and, therefore, does not affect the speed of the generator. This results in the generator output power frequency not experiencing transients during multi-speed transmission ratio changing.

With the aircraft engine operating at idle speed, there is a predetermined drive ratio from the engine to the generator. With increasing engine speed, the hydro-viscous dissipative clutch is controlled to result in increased slip to maintain constant speed of the generator which results in increased loss of efficiency in the dissipative clutch. When the speed of the engine increases to a predetermined speed, the multi-speed transmission changes ratios to provide a reduced drive ratio between the engine and the dissipative clutch. This reduces the amount of controlled slip of the dissipative clutch. As engine speed further increases, the dissipative clutch can be controlled for increased slip and there may be one or more additional changes in the ratio of the multi-speed transmission. It is important to drive the generator at constant speed and avoid transients during ratio changing of a multi-speed transmission and this result is accomplished because of the hydro-viscous dissipative clutch being operable to transmit torque essentially independent of relative slip speed between the input and output of the dissipative clutch.

A feature of the invention as defined in the preceding paragraph is in the ability of the structure to achieve a dissipative engine start by utilizing the generator as a motor. The dissipative clutch can be controlled to be under no load to enable bringing the generator, acting as a motor, up to speed and, with selection of the most suitable ratio of the multi-speed transmission, the dissipative clutch can then be controlled to apply torque through the dissipative clutch until the cut-out speed of the engine is reached.

A further object of the invention is to provide a multi-range drive for use in a starter-generator drive comprising a first shaft connectable to a variable speed engine, a second shaft connectable to a generator to be driven at constant speed, a controllable hydro-viscous dissipative clutch operatively connected to said shafts to provide for constant speed drive of the second shaft and the generator with the engine operating at variable speeds, and means interposed between said first shaft and said clutch for providing different drive ratios between said engine and said clutch means to achieve a more nearly constant speed input to said clutch over the entire range of engine speeds.

Still another object of the invention is to provide a constant speed drive for a generator driven by an engine operable at varying speeds comprising, a first shaft connectable to the engine, a second shaft connectable to the generator, hydro-viscous dissipative clutch means for transmitting torque from the first shaft to the second shaft, and a multi-speed transmission means interposed between the first shaft and the hydro-viscous dissipative clutch means for stepping the engine speed applied to the hydro-viscous dissipative clutch means by the first shaft.

An additional object of the invention is to provide a multi-range aircraft starter-generator drive for alternatively driving the generator from a variable speed engine or utilizing the generator as a motor to start the engine, comprising a first shaft for operative connection to an engine, planetary gear means having plural relatively movable planetary elements with a first planetary element connected to said first shaft, a selectively operable brake and at least one drive train connected to planetary elements of the planetary gear means, a hydro-viscous dissipative clutch having a pair of clutch shafts with one of said pair of clutch shafts connectable to the generator and the other to said drive train and said drive train having a selectively operable clutch whereby there can be different drive ratios between the engine and the dissipative clutch depending upon selective operation of the clutch and the brake.

DESCRIPTION OF THE PREFERRED EMBODIMENT

Figure 1:
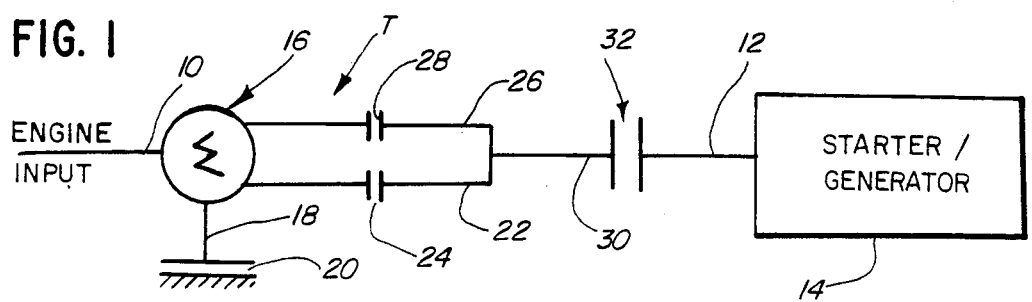
FIG. 1 is a diagrammatic view of the multi-range dissipative starter-generator drive.
Figure 2:
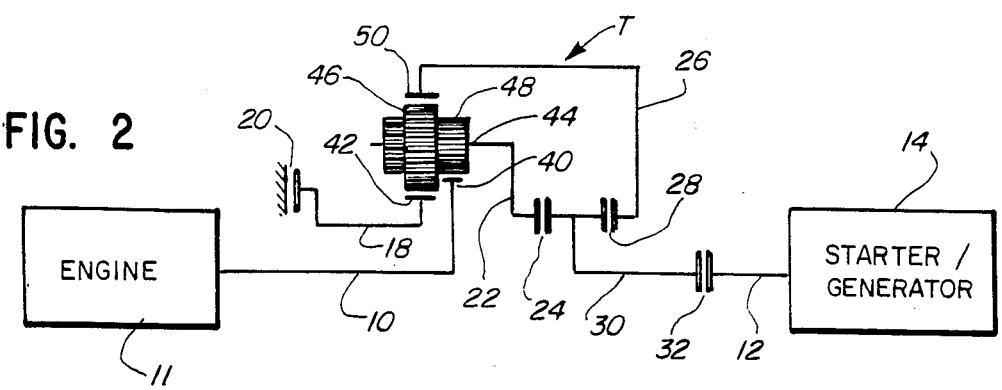
FIG. 2 is a schematic view of the starter-generator drive.

The multi-range dissipative starter-generator drive is generally shown in FIGS. 1 and 2 and has a first shaft 10 connectable to an engine 11 and a second shaft 12 connectable to a starter-generator 14, well-known in the art. When the generator is driven at constant speed, it provides a constant output power frequency usable as a power source for electrical systems, such as those used in aircraft. The generator can operated as an electric motor for starting of an engine connected to the first shaft 10.

The first shaft 10 extends to a multi-speed transmission T having planetary gear means 16 with a plurality of relatively movable planetary elements and is drivingly connected to a first planetary element. A second planetary element is connected by means of a shaft 18 to a selectively operable brake 20. The planetary gear means has third and fourth planetary elements each associated with first and second drive trains, respectively. A first drive train 22 has a selectively operable clutch 24 and connects to the third planetary element and a second drive train 26 connects to the fourth planetary element and has a selectively operable clutch 28. The first and second drive trains 22 and 26 have a common drive connection to a clutch shaft 30 which connects to a controllable hydro-viscous dissipative clutch 32.

Figure 5:
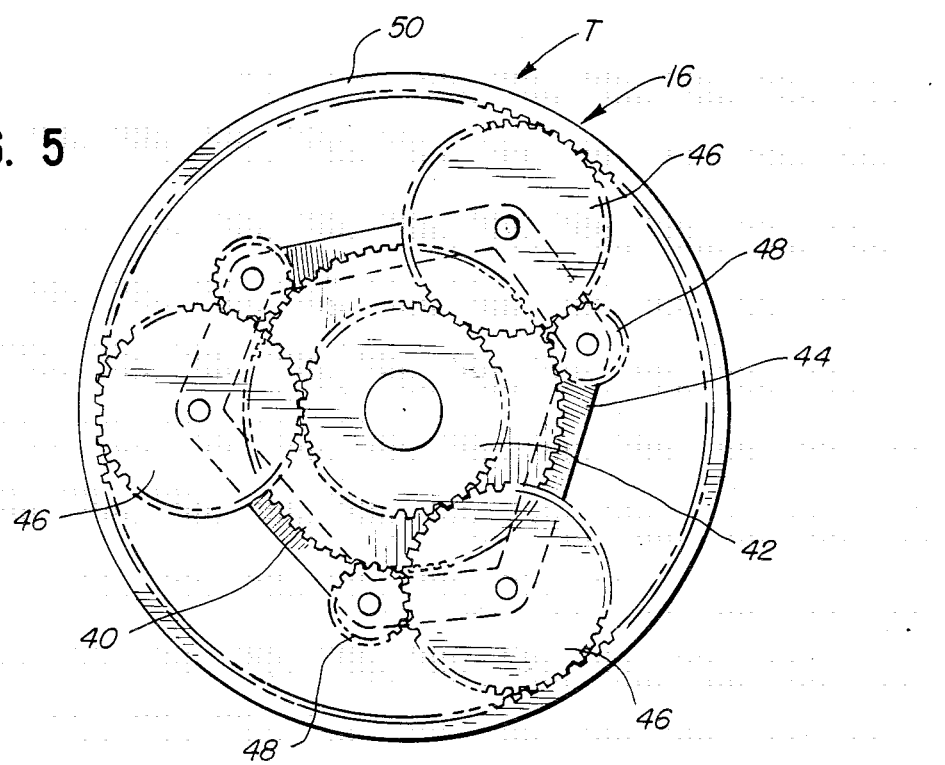
FIG. 5 is an end elevational view of a planetary gear means usable in the starter-generator drive.

The planetary gear means 16 is more particularly shown in FIG. 5 and is of the type sometimes known as a "Ravigneaux" gear set. There is a single ring gear, a planet carrier having two sets of meshing planet gears of different diameter and a pair of sun gears, with there being one sun gear for each of the sets of meshing planet gears. More particularly, the first shaft 10 is in driving connection with a large diameter sun gear 40 which is the previously referred to first planetary element. The second planetary element is a sun gear 42 of smaller diameter than the sun gear 40 and which is in driving connection with the shaft 18 associated with the selectively operable brake 20.

The first drive train 22 having the selectively operable clutch 24 is connected to the third planetary element which is the planet carrier 44 which carries the two sets of meshing planet gears. The two sets of meshing planet gears are of different diameter with the large diameter planet gears being identified at 46 and the small diameter planet gears being identified at 48. The two sets of meshing planet gears are arranged in pairs with a large diameter and small diameter planet gear meshing with each other. The large diameter planet gears 46 mesh with the small diameter sun gear 42 and the small diameter planet gears 48 mesh with the large diameter sun gear 40.

The fourth planetary element is a ring gear 50 which meshes with the large diameter planet gears 46. The ring gear 50 is in driving connection with the second drive train 26 having the selectively operable clutch 28.

Figure 6:
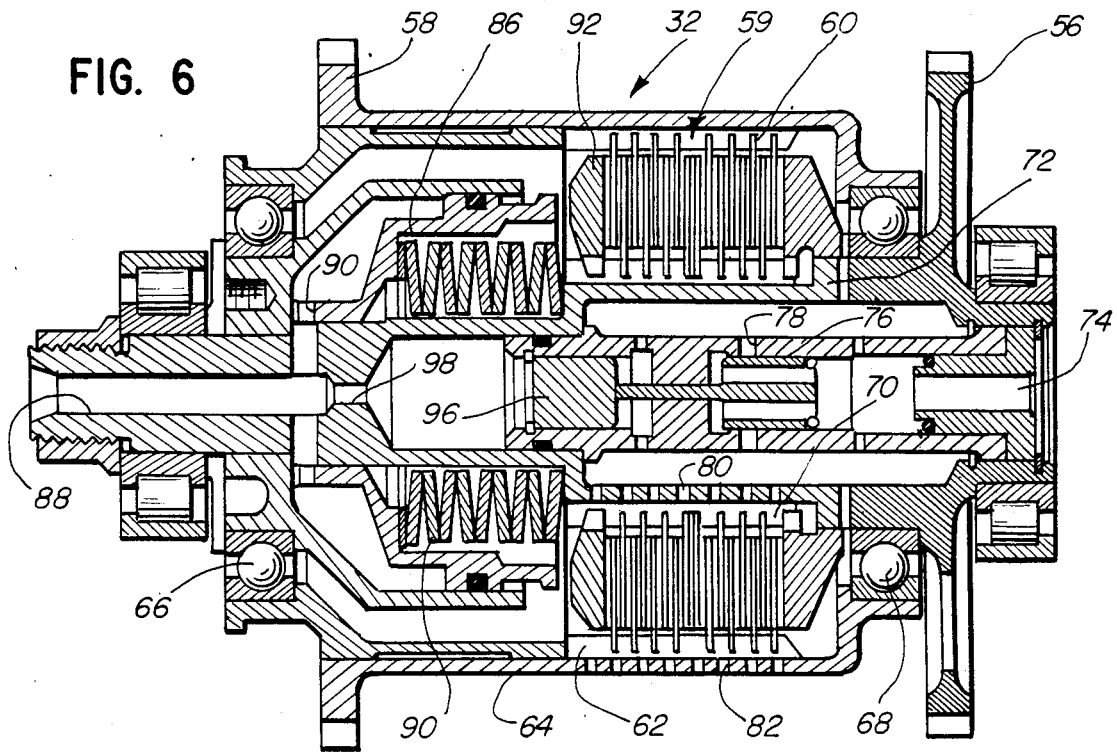
FIG. 6 is a vertical sectional view of a controllable hydro-viscous dissipative clutch usable in the starter-generator drive.

The controllable hydro-viscous dissipative clutch 32 is shown more particularly in FIG. 6 and has an input gear 56 connectable to the clutch shaft 30, and an output gear 58 connectable to the second shaft 12 which is in driving relation with the starter-generator 14.

The dissipative clutch 32 has a clutch plate assembly 59 including a series of clutch plates 60 of annular configuration and with every other plate being keyed at its exterior periphery to keys 62 associated with a tubular member 64 mounting the output gear 58 and which is rotatably supported on interiorly disposed clutch structure by bearings 66 and 68. The clutch plates interfitting with the plates keyed to the tubular member 64 are keyed at their interior periphery to keys 70 associated with a tubular member 72 which mounts the input gear 56. The dissipative clutch operates in a hydro-viscous manner by transmitting torque through the viscous shearing of an oil film. The oil is supplied to the clutch plate assembly 59 through an inlet passage 74. When a valve member 76 is shifted to the right from the position shown, the oil can flow through radial passages 78 and passages 80 in the tubular member 72 to flow between the plates 60 of the clutch assembly 59. The oil also functions as a cooling flow and is discharged from the clutch assembly 59 through openings 82 in the tubular member 64.

The transmission of torque by the dissipative clutch is controlled by means of a control piston 86 which is subject to a control pressure existing at a port 88 and which reaches the piston through passages 90 to exert a force on the piston 86 urging it toward the right against the action of a stack of Belleville springs 90. The clutch assembly 59 has an end plate 92 which can be contacted by the right-hand end of the piston 86 to transmit force from the piston to a compressive force on the plates 60 of the clutch assembly 59 and with the compressive force controlling the amount of slip that can occur in the dissipative clutch. The control pressure of port 88 also acts upon a piston 96 through a passage 98 to shift the valve member 76 to the right from the position shown in FIG. 6 when a control pressure exists at port 88. The control pressure is varied to control the slip.

Figure 3:
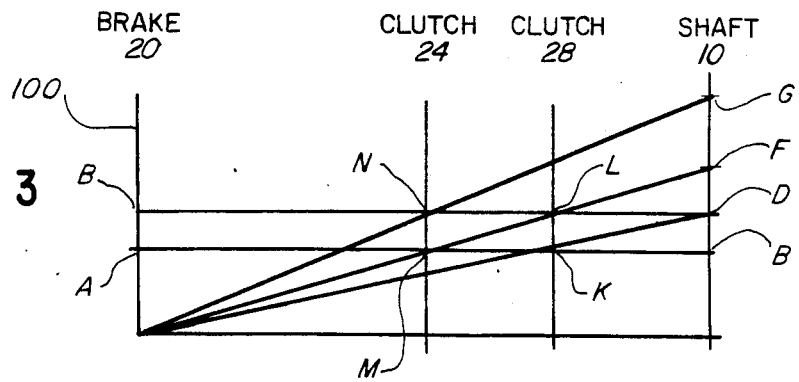
FIG. 3 is a speed nomograph for the starter-generator drive operating in the generator driving mode.

The structure described provides for three different ratios in the multi-speed transmission T. The multi-speed transmission includes the planetary gear means 16, the selectively operable brake 20 and the first and second drive trains and their selectively operable clutches 24 and 28. A first drive ratio is achieved by having the brake 20 released and by engaging both of the clutches 24 and 28. This provides for operation of the starter-generator 14 in a generating mode when the engine is operating between points B and D on a line representing the speed of the engine and the first shaft 10 in FIG. 3. Engine speed can increase from point B through points D and F to a top speed at point G.

Figure 4:
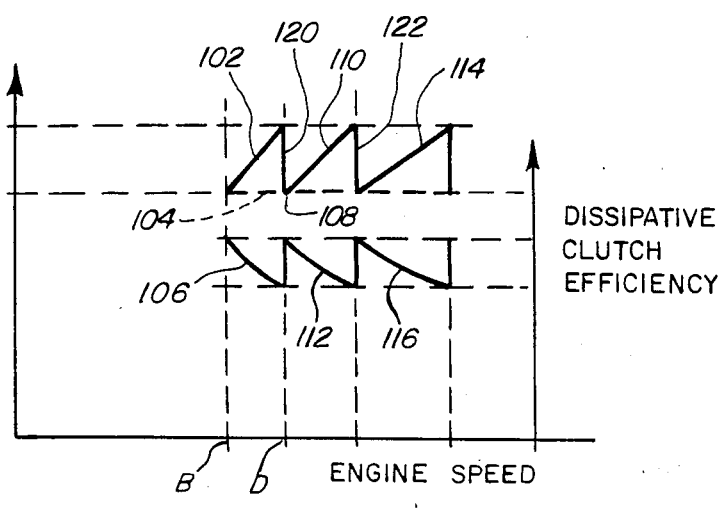
FIG. 4 is a graph illustrating clutch speeds and efficiency with respect to engine speed.

With both clutches 24 and 28 engaged and the brake 20 disengaged, an element of the brake 20 is free to rotate between points A and B on a line 100. The input speed range to the dissipative clutch 32 is between those two points. This provides a first range of operation and with the dissipative clutch speed and efficiency being illustrated in the graph of FIG. 4. In the first range of engine speed between points B and D comparable to the same points in the speed nomograph of FIG. 3, the input speed to the dissipative clutch will increase, as illustrated by line 102, while the clutch output speed will remain constant, as indicated by a broken line 104 which extends horizontally through all three speed ranges to be described. As the clutch input speed increases, as indicated by the line 102, the clutch efficiency decreases, as indicated by a line 106, because of the dissipative clutch being controlled to have increasing slip with increasing engine speed.

At the end of the first range, a second drive ratio is achieved by changing ratio in the multi-speed transmission and more particularly by leaving clutch 28 in engagement, releasing clutch 24 and engaging brake 20. In this range, the engine speed is operating between points D and F in the speed nomograph of FIG. 3. Assuming the engine speed is at point D, the input speed to the dissipative clutch is at a speed indicated at point K in the speed nomograph which drops the clutch input speed to an original value and as shown as point 108 in FIG. 4. As engine speed increases from point D to point F, in the speed nomograph of FIG. 3, the output speed of the multi-speed transmission increases from point K to L. This represents a progressively increasing input speed to the dissipative clutch 32, as indicated by the line 110 in FIG. 4. This requires increasing clutch slip and there is a progressively decreasing clutch efficiency, as indicated by the line 112.

At the end of the second range of operation, there can be a third range established by leaving the brake 20 engaged and changing the condition of the clutches 24 and 28 to have the clutch 24 engaged and the clutch 28 disengaged. This operation occurs at point M in FIG. 3 and as engine speed increases beyond point F toward point G the output speed of the multi-speed transmission can rise to point N. This rise results in increase in input speed to the dissipative clutch 32, as indicated by the line 114 in FIG. 4, and a corresponding adjustment of the dissipative clutch for increased slip and, therefore, decreased efficiency is indicated by line 116. It should be noted that throughout all three ranges, the clutch output speed represented by line 104 remains constant.

The controllable hydro-viscous dissipative clutch operates in a hydro-viscous manner by transmitting torque through the viscous shearing of an oil film. The equivalent coefficient of friction thereof is essentially independent of relative slip speed between the clutch plates 60 of the clutch assembly 59 of the dissipative clutch. As a result, sudden changes of speed in the input to the clutch 32, as represented by lines 120 and 122 in FIG. 4 in changing between ranges of operation, do not affect the torque transmitted through the dissipative clutch to the generator. Therefore, the speed of the generator and the generator output power frequency do not experience transients during ratio changing.

The described structure enables a dissipative engine start without the engine 11 being driven until the starter-generator operating as an electric motor has been brought up to speed. This is achieved by having the dissipative clutch 32 open and in a no-load condition. The most suitable ratio of the multi-speed transmission is selected and the dissipative clutch 32 is then placed under load to apply torque therethrough with the generator operating as electric motor rotating at some predetermined speed range which is normally a constant speed. The most suitable ratio of the multi-speed transmission would normally be that ratio which gives the lowest engine speed and would be established by engaging clutches 24 and 28 and releasing the brake 20 to provide the slowest speed at the first shaft 10 connectable to the engine 11.

I claim:

1. A multi-range starter-generator drive connected between a variable speed engine and a generator, comprising: a first shaft drivingly coupled to the variable speed engine, a second shaft drivingly coupled to the generator to be driven at constant speed, a controllable hydro-viscous dissipative clutch having a movable control member said hydro-viscous clutch being operatively connected to said shafts controllable for constant speed drive of the second shaft and the generator with the engine operating at variable speeds, and plural drive output means interposed between said first shaft and said clutch providing different drive ratios between said engine and said clutch to achieve a more nearly constant speed input to said clutch over the entire range of engine spees.

2. A multi-range aircraft starter-generator drive as defined in claim 1 wherein said means providing different drive ratios comprises planetary gear means with plural drive outputs.

3. A multi-range aircraft starter-generator drive as defined in claim 2 wherein said planetary gear means includes a planetary element connected to an selectively operable brake.

4. A multi-range aircraft starter-generator drive as defined in claim 2 wherein each of said plural drive outputs has a selectively operable clutch associated therewith.

5. A multi-range starter-generator drive comprising: a first shaft connectable to a variable speed engine, a second shaft drivingly coupled to a generator to be driven at constant speed, controllable hydro-viscous dissipative clutch means operatively connected to said shafts for constant speed drive of the second shaft and the generator with the engine operating at variable speeds, and multi-speed transmission means interposed between said first shaft and said dissipative clutch means providing plural output drive ratios from said engine to said dissipative clutch means to achieve a more nearly constant speed input to said dissipative clutch means over the entire range of engine speeds, said multi-speed transmission means having plural drive outputs and each drive output having a selectively operable clutch associated therewith.

6. A multi-range aircraft starter-generator drive in combination with a variable speed engine and a generator for alterntively driving the generator from the variable speed engine or utilizing the generator as a motor to start the engine, comprising: a first shaft drivingly coupled to the engine, planetary gear means having plural relatively movable planetary elements with a first planetary element connected to said first shaft, a selectively operable brake and at least one drive train connected to planetary elements of the planetary gear means, a hydro-visous dissipative clutch having a member movable to control the slip of the clutch and a pair of drive elements with one of said pair of drive elements drivingly coupled to the generator and the other to said drive train and said drive train having a selectively operable clutch whereby there can be different drive ratios between the engine and the dissipative clutch depending upon selective operation of the clutch and the brake.

7. A constant speed drive for driving a generator at constant speed from a variable speed engine comprising, a first shaft for operative connection to an engine, planetary gear means having plural relatively movable planetary elements with a first planetary element connected to said first shaft, and also having second, third and fourth planetary elements, a selectively operable brake connected to said second planetary element, first and second drive trains with the first drive train connected to the third planetary element for movement therewith and the second drive train connected to the fourth planetary element, hydroviscous means for transmitting torque and having a pair of shafts with one of said pair of shafts drivingly coupled to the generator, said first and second drive trains being both connected to the other of said pair of shafts, and each of said first and second drive trains having a selectively operable clutch whereby there can be different drive ratios between the engine and the constant torque-transmitting means depending upon which of said selectively operable clutches is operable as well as selective operation of the brake.

8. A multi-range aircraft starter-generator drive for alternatively driving the generator from a variable speed engine or utilizing the generator as a motor to start the engine, comprising: a first shaft for operative connection to an engine, planetary gear means having plural relatively movable planetary elements with a first planetary element connected to said first shaft, and also having second, third and fourth planetary elements, a selectively operable brake connected to said second planetary element, first and second drive trains with the first drive train connected to the third planetary element for movement therewith and the second drive train connected to the fourth planetary element, a hydro-viscous dissipative clutch having a pair of clutch shafts with one of said pair of clutch shafts drivingly coupled to the generator, said first and second drive trains being both connected to the other of said clutch shafts, and each of said first and second drive trains having a selectively operable clutch whereby there can be any one of three different drive ratios between the engine and the dissipative clutch depending upon which of said selectively operable clutches is operable as well as selective operation of the brake.

* * * * *